May 14, 1968   J. L. WALLACE, JR   3,383,580
BATTERY-LIFE INDICATOR
Filed March 16, 1964

INVENTOR

JACOB L. WALLACE, JR.

BY *Tipton D. Jennings*
ATTORNEY 3,383,580
BATTERY-LIFE INDICATOR
Jacob Lightsey Wallace, Jr., Springfield, Va., assignor to Susquehanna Corporation, a corporation of Delaware
Filed Mar. 16, 1964, Ser. No. 352,195
7 Claims. (Cl. 320—48)

ABSTRACT OF THE DISCLOSURE

The collector-to-emitter voltage of a transistor used in a voltage regulator is monitored to give an indication of the remaining life of the battery which is being regulated. A volt-meter is swiched across this collector-emitter path when a reading is desired. The meter face is graduated in hours of remaining battery life and the meter pointer will deflect to give a reading. The amount of deflection will be determined by the voltage difference between the collector, which is at battery potential, and the emitter, which is at the regulated potential.

---

The present invention relates to apparatus for determining battery condition. More specifically, it relates to apparatus for detecting and indicating the condition, such as the remaining useful life, of batteries used in battery-driven circuits or equipment.

The desirablity of being able to determine the condition of the battery in a battery-driven circuit or equipment is well recognized in the art. The methods generally used consist of yes-no indications which give no indication when useful battery life will end until the battery level has already dropped below the minimum usable value. This yes-no method, therefore, fails to provide any indication of whether the battery is capable of providing adequate service during the operation of the circuit or equipment with which the battery is associated. Other methods for determining battery condition have been used but these entail additional circuitry or require a deviation of the battery-driven circuit from its normal function in order to check the battery. Furthermore, none of these previous methods provide a simple way, free of continual adjustment, to determine exactly the remaining useful life of a battery in circuit.

Accordingly, an object of the invention is to provide apparatus for obtaining a true indication of battery condition or remaining life while the battery is connected in an operating circuit.

Another object of the invention is to provide such apparatus without the necessity of having to add additional circuit components or to continually adjust such apparatus to obtain an indication.

Still another object is to provide a battery-life indicator capable of providing an accurate indication of remaining battery life prior to a drop in battery potential below a useful level, thereby permitting operating personnel to replace the battery prior to the end of its useful life.

A further object of the invention is to provide a battery life indicator which gives an accurate indication of remaining battery life to permit a determination whether such life is sufficient to supply service during extended use of the battery-driven circuit or equipment.

Figure 1:
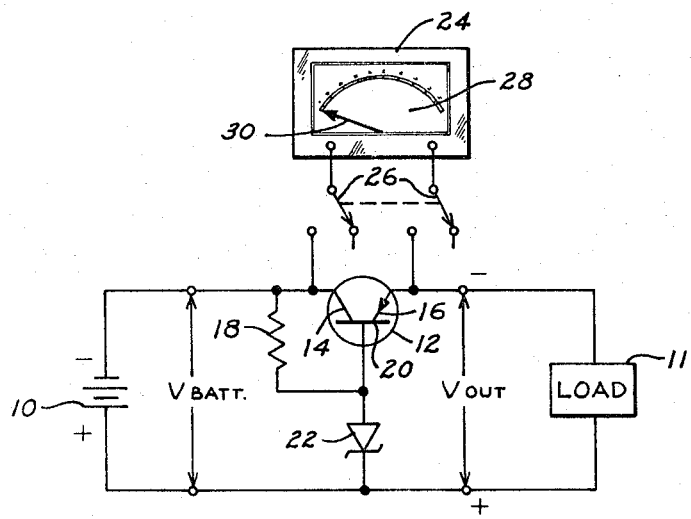
Figure 2:
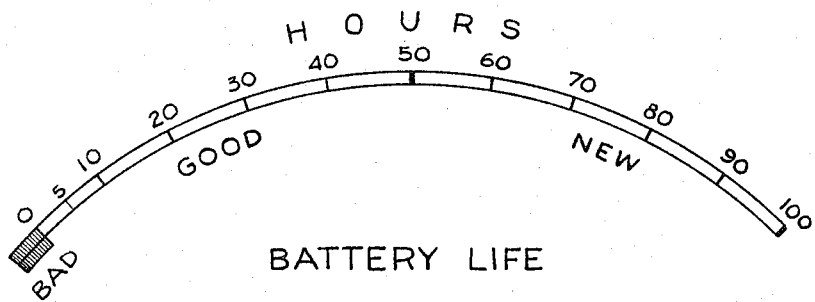

Other objects and advantages of this invention will become apparent from a reading of the following specification, in conjunction with the various figures in which:

FIGURE 1 is a schematic diagram, partly in block diagram form, of an improved battery life indicator, in accordance with the present invention; and FIGURE 2 shows the face of a meter scaled in terms of battery life.

Broadly speaking, the invention comprises battery life indicating apparatus in combination with a voltage regulator which regulates the battery voltage being applied to a load. Connected in series between the battery output and the regulated output is a component of the voltage regulator across which a meter is placed to sense the difference in voltage across this component. The face of the meter is scaled to indicate remaining battery life in response to the voltage difference across said component.

Referring now to FIGURE 1, there is shown an improved battery life indicating apparatus. A battery 10 is connected in circuit with a conventional voltage regulator which serves to regulate the battery output voltage to derive a constant output voltage during the useful life of the battery. The voltage regulator is provided with negative and positive output terminals across which a load 11 is applied to receive the regulated output voltage. The battery 10 can be, for example, a Burgess XX15 comprising 15 F40 wafer cells and having a 22½ volt rating when new. This particular Burgess battery has approximately a linear discharge during its useful life.

The voltage regulator consists of a transistor 12, shown here as a PNP transistor, which has its collector 14 connected to the negative pole of battery 10 and its emitter 16 connected to the negative output terminal of the regulator. A bias resistor 18 having a value of 22K ohms is provided between the collector 14 and the base 20 of transistor 12. A constant voltage device such as Zener diode 22 has its anode connected to the base 20 of transistor 12 and its cathode connected to the positive output terminal.

The aforedescribed voltage regulator will derive a regulated output voltage so long as the voltage of battery 10 remains above the Zener voltage of the Zener diode 22. Assuming that the Zener voltage of Zener diode 22 is 13 volts, then so long as the output voltage of battery 10 does not drop below approximately 13½ volts, the Zener diode will conduct. With Zener diode 22 conducting, the voltage at its anode and therefore the voltage at the base 20 of transistor 12 will remain essentially constant. Since the voltage at emitter 16 follows the voltage at base 20 the output voltage applied to the load 11 will remain essentially constant at approximately the Zener voltage of 13 volts.

During the life of the battery 10, continuous or periodic use of the load equipment or circuit, to which the output voltage of the regulator is applied, will drain the battery and eventually cause its voltage to drop to or fall below the breakdown voltage of Zener 22. When this occurs, Zener 22 no longer conducts, regulation of battery 10 is lost and the useful life of the battery, so far as this circuit is concerned, is terminated. Operating personnel often desire to know the condition of battery 10, as for example, the number of hours of useful life remaining in this battery so that it can be replaced before its output falls below the voltage of Zener 22 and regulation is lot. To this end there is provided a voltmeter 24 which is connected across the series path of the emitter 16 and collector 14 of transistor 12. Switch 26 is provided in circuit with voltmeter 24 which when closed permits a testing of the condition of battery 10. The provision of the switch 26 permits the meter 24 to be free for functions other than battery testing since it is generally not necessary to continually monitor battery condition. The meter 24 is provided with a face 28 and deflectable pointer 30.

FIGURE 2 is an example of a layout for the face 28 of meter 24 which shows a scale that can be used to determine battery life. This arc-shaped scale is graduated in hours of remaining battery life from zero to one hundred hours which approximates the life of this particular battery for a 4 mil current drain. The one hundred hour mark additionally designates a "new" battery while to the left of the scale there is a representation that the battery condition is still "good." Substantially, the entire scale can be used to represent the percentage of useful battery life remaining. Only a small portion, approximately 4% to 5%, of the scale is necessary to show that the battery is "bad," i.e., that the output voltage of the battery 10 has dropped below that value necessary to keep the Zener diode 22 conducting. This meter face will be referred to in describing the operation of my invention.

Assuming that the battery 10 is new and has an actual output voltage of 22½ volts, then since the regulated output is 13 volts, the difference between the collector voltage and the emitter voltage 22½ minus 13, or 9½ volts. The meter 24 is therefore constructed so that 9½ volts will give full scale deflection of the pointer 30 from left to right. Thus, closing switch 26, will by deflection of pointer 30, indicate a "new" battery with 100 hours of remaining life. After the battery 10 has been in service and another indication of remaining battery life is desired, switch 26 can again be depressed and the deflection of needle 30 observed. If a decrease in the output voltage of battery 10 has occurred, there will be a decrease in the voltage difference across the emitter-collector path of transistor 12. In response to this decrease in voltage difference the needle 30 will deflect a lesser amount than when the battery was new and a lower reading in hours of remaining battery life is obtained. This relationship shows that the voltage difference across the circuit element consisting of the emitter-collector path is a function of the age of battery 10. In this particular example this voltage difference is proportional to the remaining life in the battery due to the linear discharge of this particular battery 10, and the scale shown in FIGURE 2 is graduated linearly with each ten hour division representing a voltage difference of approximately .9 volt.

Eventually battery drain will cause a decrease in battery voltage to a level slightly above the regulated output votlage. Assuming a voltage difference across the emitter-collector path of transistor 12 of one volt, a check of battery condition will cause the needle to deflect slightly and indicate a remaining life of about 5 hours. By observing this reading, operating personnel can now prepare to replace battery 10 with a new battery before regulation is lost by virtue of a further decrease in the output voltage of battery 10. This five-hour mark, therefore, can be used as a warning of the forthcoming end of useful battery life while still providing a satisfactory safety factor of five hours before the needle reaches "zero."

Should timely replacement of battery 10 not occur, further battery drain will cause the voltage difference across the emitter-collector path to decrease to about one half volt. The battery voltage is then at about 13½ volts and the Zener diode 22 is on the verge of going non-conducting. No useful life remains in the battery 10 and a check of battery life gives a "zero" reading. Further use of this battery will cause the Zener to cut off resulting in loss of battery regulation. A check of battery condition at this time will indicate a "bad" battery with no useful life remaining. This is because once diode 22 goes non-conducting, all current through resistor 18 flows into the base 20 of transistor 12 to cause this transistor to conduct heavily. The voltage drop across the emitter-collector path is less than a half volt causing the needle 30 to lie within the "bad" portion of the scale.

Although it has been shown that the voltage difference across a voltage regulator element, here being the collector-emitter path of transistor 12, is a function of battery life, it is obvious that the change in voltage difference will not always be linear with respect to useful battery life. This is because not all batteries discharge substantially linearly as does the exemplary Burgess XX15 used in describing the invention. In the event that it is desired to detect the condition of a battery having a non-linear discharge, the meter face 28 can be made non-linear to correspond to the non-linear change of voltage difference with respect to battery life. Additionally, the five-hour mark has been used as a representative warning signal. It is obvious that any reading may be used as a warning, particularly in those cases where it is not feasible to replace the battery while the battery-driven circuit or equipment is being used. In such event the battery can be checked beforehand to see if sufficient life remains in the battery to insure regulated output voltage during the ensuing use of the equipment or circuit.

It will be apparent that various modifications may be made within the spirit and scope of the invention and it is desired, therefore, that only such limitations be placed on the invention as are imposed by the prior art and set forth in the appended claims.

What is claimed is:

1. Apparatus for testing and indicating the remaining life of a battery which is used to energize a load circuit, comprising a voltage regulator having a circuit element in series between the battery and the load circuit, a meter, a meter face for said meter, indicia on said meter face representative of the remaining life of said battery including the period which precedes the termination of such life, and means for connecting said meter across said circuit element to detect the difference in potential across said element, said meter being responsive to said potential difference to indicate the remaining life in said battery.

2. Apparatus for periodically testing and indicating the remaining life of a battery used to energize a load, comprising a voltage regulator for deriving a regulated output voltage for said load from the unregulated output voltage of said battery, said voltage regulator including a transistor whose collector-emitter path lies in series between the battery and load, a voltmeter, said voltmeter having a face, indicia on said face designed to indicate remaining life in said battery including the period which precedes the termination of such life, and a switch for connecting said meter across the collector-emitter path for detecting the voltage drop across said path during testing of said battery, said meter being responsive to said voltage drop to indicate remaining battery life.

3. Apparatus as described in claim 2 in which said voltmeter has a deflectable pointer, said pointer cooperating with said meter face to indicate remaining battery life when said pointer is deflected in response to the voltage drop in said collector-emitter path.

4. Apparatus for testing and indicating remaining life of a battery used to energize a load, comprising a voltage regulator for deriving a regulated output voltage for said load from the unregulated output voltage of said battery, said voltage regulator including a transistor having an emitter, a collector and a base, the emitter-collector path of said transistor being connected in series between the battery and the load, a meter including a deflectable pointer, a face for said meter, said face being graduated in hours of battery life to cooperate with said deflectable pointer to indicate a reading of remaining battery life, and means for connecting said meter across said emitter-collector path to detect the voltage drop across said path, said meter being responsive to said voltage drop to deflect said pointer and indicate a reading of hours of remaining battery life.

5. Apparatus for periodically testing and indicating remaining life of a battery used to energize a load, comprising a voltage regulator for deriving a regulated output voltage for said load from the unregulated output voltage of said battery, said voltage regulator including a transistor having an emitter, a collector and a base, the emitter-collector path of said transistor being connected in series between the battery and the load, a meter having a deflectable pointer, a face for said meter, said face graduated with time indicia of remaining battery life, said face cooperating with said deflectable pointer during testing to present a reading of remaining battery life based on the position of said pointer with respect to said indicia, and means including a switch for connecting said meter across said emitter-collector path to detect a voltage drop in said path, said meter being responsive to said voltage drop to cause said pointer to deflect.

6. A battery, a load, a voltage regulator for deriving a regulated output voltage for said load from the unregulated output voltage of said battery, said voltage regulator including a transistor having an emitter, collector and base, the emitter-collector path being located in series between the battery and the load, a meter having a deflectable pointer and a face, said face containing indicia of hours of remaining battery life, means including a switch for connecting said meter across said emitter-collector path to sense the voltage difference in said path upon actuation of said switch to a closed position, said meter being responsive to said voltage difference to cause deflection of said pointer, said pointer upon deflection cooperating with the indicia on the face of said meter to present an indication of remaining hours of battery life.

7. Apparatus for periodically testing and indicating remaining life of a battery used to energize a load, comprising a voltage regulator for deriving a regulated output voltage for said load from the unregulated output voltage of said battery, said voltage regulator including a transistor having a emitter, a collector and a base, the emitter-collector path of said transistor being connected in series between the battery and the load, a meter having a deflectable pointer, a face for said meter, said face having indicia of remaining battery life including the period which precedes the termination of such life, said face cooperating with said deflectable pointer during testing to present a reading of remaining battery life based on the position of said pointer with respect to said indicia, and means including a switch for connecting said meter across said emitter-collector path to detect a voltage drop in said path, said meter being responsive to said voltage drop to cause said pointer to deflect.

References Cited

UNITED STATES PATENTS

| | | | |
|---|---|---|---|
| 2,897,430 | 7/1959 | Winkel | 323—22 |
| 3,022,457 | 2/1962 | Doan | 323—22 |
| 3,118,137 | 1/1964 | Vincent | 324—29.5 X |
| 3,125,718 | 3/1964 | Race | 324—29.5 |
| 3,157,870 | 11/1964 | Marino et al. | 324—29.5 X |
| 3,201,682 | 8/1965 | Johnson | 323—22 |
| 3,307,101 | 2/1967 | Byles | 324—29.5 |

FOREIGN PATENTS 1,035,268  7/1958  Germany.

OTHER REFERENCES

G.E. Transistor Manual, 1962, p. 73, TK 78 72 T73 G4.

LEE T. HIX, *Primary Examiner.*

WARREN E. RAY, *Examiner.*

S. WEINBERG, *Assistant Examiner.*